(12) United States Patent
Bretschger et al.

(10) Patent No.: US 6,843,498 B2
(45) Date of Patent: Jan. 18, 2005

(54) STROLLER

(75) Inventors: Edward B. Bretschger, Hinsdale, IL (US); Peter J. Myers, Wheaton, IL (US)

(73) Assignee: Kolcraft Enterprises, Inc., Chicago, IL (US)

( * ) Notice: Subject to any disclaimer, the term of this patent is extended or adjusted under 35 U.S.C. 154(b) by 21 days.

(21) Appl. No.: 10/164,151

(22) Filed: Jun. 6, 2002

(65) Prior Publication Data

US 2003/0227157 A1 Dec. 11, 2003

(51) Int. Cl.$^7$ ................................................ B62B 7/06
(52) U.S. Cl. ...................... 280/642; 280/643; 280/650; 280/47.4; 280/47.38
(58) Field of Search ................................ 280/642, 643, 280/644, 647, 648, 650, 658, 47.38, 47.39, 47.4; 297/188.18, 358, 373, 369

(56) References Cited

U.S. PATENT DOCUMENTS

| 2,982,562 A | | 5/1961 | Gladstein |
|---|---|---|---|
| 3,083,997 A | | 4/1963 | Chreist, Jr. |
| 3,208,763 A | | 9/1965 | Boyd |
| 3,223,431 A | | 12/1965 | Gottfried et al. |
| 3,829,113 A | | 8/1974 | Epelbaum |
| 4,570,956 A | | 2/1986 | Dyer |
| 4,725,071 A | * | 2/1988 | Shamie ....................... 280/643 |
| 4,729,572 A | | 3/1988 | Bergeron |
| 4,750,783 A | | 6/1988 | Irby et al. |
| 4,768,795 A | | 9/1988 | Mar |
| 4,822,064 A | | 4/1989 | Hunter |
| 4,858,947 A | * | 8/1989 | Yee et al. .................... 280/643 |
| 4,861,105 A | | 8/1989 | Merten et al. |
| 4,874,182 A | | 10/1989 | Clark |
| D305,316 S | | 1/1990 | Lin |
| 4,921,261 A | | 5/1990 | Sadler, Jr. et al. |
| 5,018,754 A | | 5/1991 | Cheng |
| 5,056,865 A | | 10/1991 | Sedlack |
| 5,121,940 A | | 6/1992 | March |
| 5,133,567 A | | 7/1992 | Owens |
| D331,208 S | | 11/1992 | Peebles et al. |
| 5,167,425 A | * | 12/1992 | Chen .......................... 280/648 |
| 5,184,835 A | * | 2/1993 | Huang .................... 280/47.371 |
| 5,201,535 A | | 4/1993 | Kato et al. |
| 5,205,579 A | | 4/1993 | Kato et al. |
| 5,221,106 A | | 6/1993 | Shamie |
| 5,234,224 A | | 8/1993 | Kim |

(List continued on next page.)

FOREIGN PATENT DOCUMENTS

| GB | 2 193 692 | 2/1988 |
|---|---|---|
| GB | 2 254 587 | 10/1992 |
| GB | 2 262 914 | 7/1993 |

OTHER PUBLICATIONS

Century, Convenience Strollers, Circa, 1992.
Evenflo, Infant travel systems, 1997.
Century, 4–in–1 System, 1997.
Century, 4–in–1 System, 1995.

Primary Examiner—Christopher P. Ellis
Assistant Examiner—J. Allen Shriver
(74) Attorney, Agent, or Firm—Marshall, Gerstein & Borun LLP

(57) ABSTRACT

A stroller assembly may include a frame with first and second spaced members. First and second seats may be attached to the frame. The second seat may have a seat base and a seat back, the first and second spaced members disposed opposite each other across seat base. The stroller assembly may also include at least one member disposed opposite the seat back in at least first and second positions. The seat base, seat back, spaced members and the at least one member may define at least two recesses, the first recess defined with the at least one member in the first position to accept a first infant transporter and the second recess defined with at least one member in the second position to accept a second infant transporter different than the first infant transporter.

22 Claims, 7 Drawing Sheets

U.S. PATENT DOCUMENTS

| | | | |
|---|---|---|---|
| 5,333,893 A | * 8/1994 | Chen | 280/642 |
| 5,338,096 A | 8/1994 | Huang | |
| 5,417,449 A | * 5/1995 | Shamie | 280/642 |
| 5,472,224 A | 12/1995 | Jane Cabagnero | |
| 5,499,831 A | 3/1996 | Worth et al. | |
| 5,562,300 A | 10/1996 | Nelson | |
| 5,562,330 A | 10/1996 | Jane Cabagnero | |
| 5,624,152 A | * 4/1997 | Yoshie et al. | 297/184.13 |
| 5,676,386 A | 10/1997 | Huang | |
| 5,707,106 A | 1/1998 | Clark | |
| 5,722,682 A | * 3/1998 | Wang | 280/642 |
| 5,727,798 A | 3/1998 | Walters et al. | |
| D402,235 S | 12/1998 | Haut | |
| 5,865,447 A | 2/1999 | Huang | |
| 5,876,046 A | 3/1999 | Courtney et al. | |
| 5,947,555 A | 9/1999 | Welsh, Jr. et al. | |
| D421,940 S | 3/2000 | Gibson et al. | |
| 6,070,890 A | 6/2000 | Haut et al. | |
| 6,086,087 A | * 7/2000 | Yang | 280/658 |
| D431,212 S | * 9/2000 | Haung | D12/129 |
| 6,189,914 B1 | 2/2001 | Worth et al. | |
| 6,241,273 B1 | * 6/2001 | Gehr | 280/642 |
| 6,267,406 B1 | * 7/2001 | Huang | 280/647 |
| 6,286,844 B1 | 9/2001 | Cone, II et al. | |
| 6,302,412 B1 | 10/2001 | Worth et al. | |
| 6,331,032 B1 | 12/2001 | Haut et al. | |
| D455,679 S | * 4/2002 | Tai et al. | D12/129 |
| 6,431,579 B1 | * 8/2002 | Kaneko et al. | 280/642 |
| D465,754 S | * 11/2002 | Huang | D12/129 |
| 6,585,284 B2 | * 7/2003 | Sweeney et al. | 280/650 |
| 2002/0017769 A1 | 2/2002 | Worth et al. | |
| 2002/0036391 A1 | * 3/2002 | Sweeney et al. | 280/650 |
| 2003/0111878 A1 | * 6/2003 | Cheng et al. | 297/188.18 |

* cited by examiner

STROLLER

FIELD OF DISCLOSURE

This specification relates generally to a stroller, and in particular a stroller useable with more than one child.

BACKGROUND

A stroller may include a frame to which more than one seat is attached. The seats may be attached to the frame with the seats are arranged one behind the other. This arrangement may be referred to as a tandem arrangement. Alternatively, the seats may be attached to the frame with the seats arranged one beside the other. By providing more than one seat, a parent may use a single stroller to transport more than one child, rather than using multiple strollers for multiple children.

DESCRIPTION OF THE PREFERRED EXAMPLES

Figure 1:
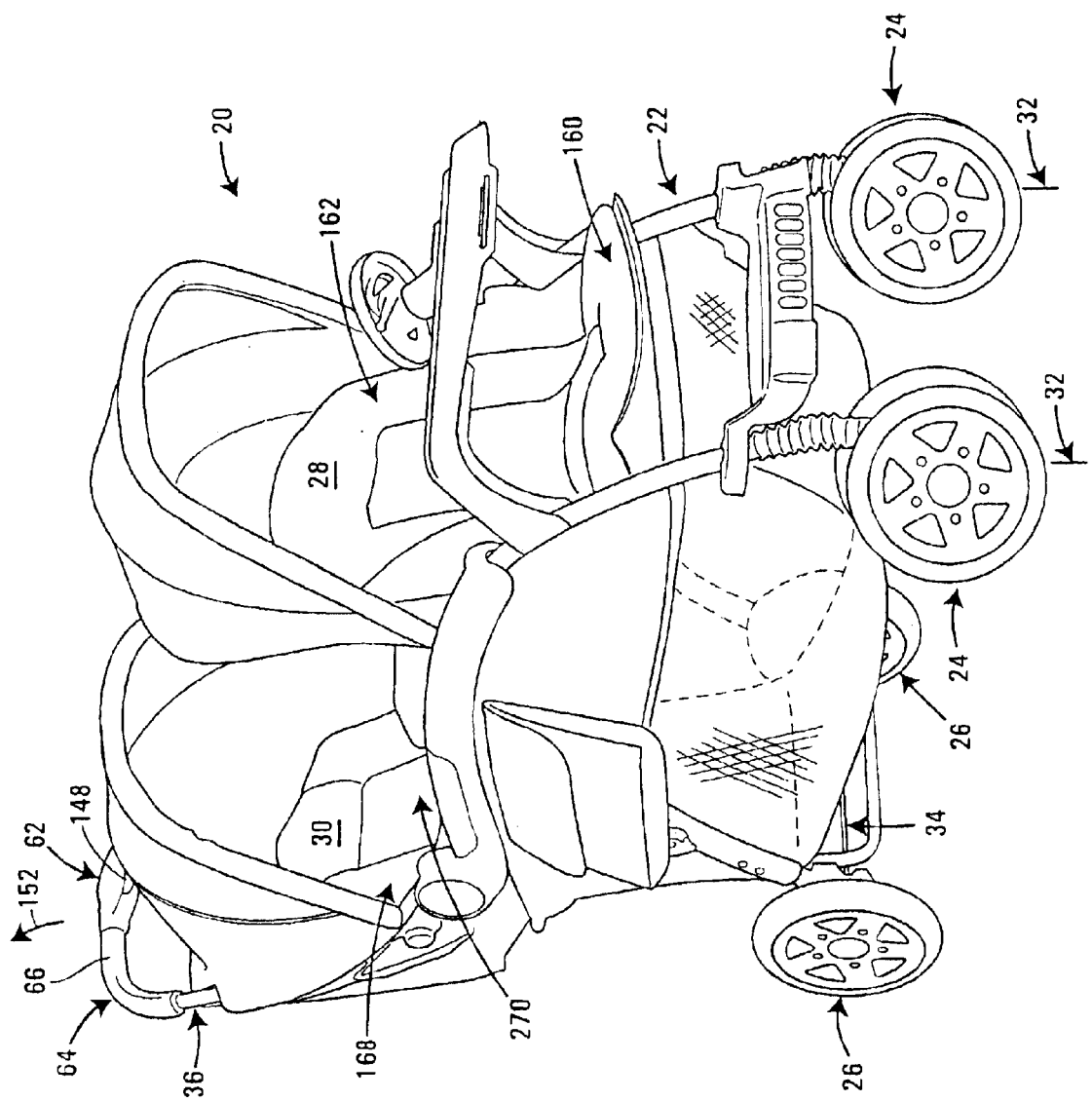
FIG. 1 is a perspective view of a stroller.

A stroller 20 is shown in FIG. 1. The stroller 20 may include a frame assembly (or frame for short) 22, first and second sets of wheels 24, 26, and first and second seats 28, 30. The first set of wheels 24 may be separately pivotably mounted on the frame 22, such that the wheels may independently move about a pair of parallel, substantially vertical axes 32 relative to the frame 22. By contrast, the second set of wheels 26 may be mounted to the frame 22 using a common axle 34, as shown, such that the wheels do not rotate about a vertical axis relative to the frame 22, but only a horizontal axis. The first seat 28 may be mounted to the frame 22 in line with the second seat 30. In this orientation, the first seat 28 may be referred to as the front seat, and the second seat 30 may be referred to as the rear seat. While this naming convention regarding "front" (or "forward") and "rear" (or "backward") is used throughout, this is merely for purposes of convenience and illustration, and not by way of limitation.

Figure 2:
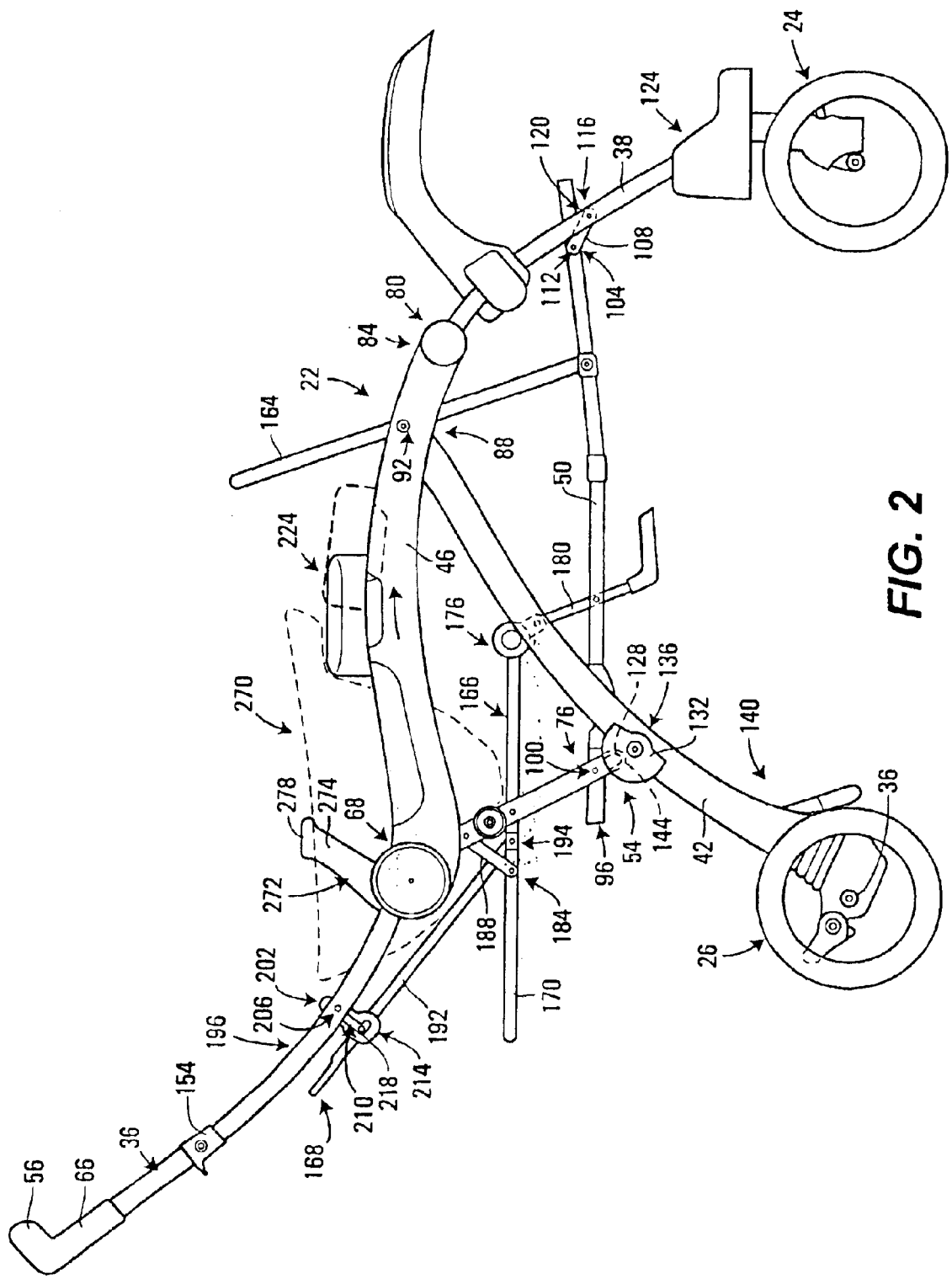
FIG. 2 is a side view of the stroller of FIG. 1 with the soft goods removed.

Referring now to FIG. 2, it will be recognized that the frame assembly 22 may include a number of members. As shown, the frame 22 includes a handle 36, first and second front wheel support members 38, 40, first and second rear wheel support members 42, 44, first and second upper side members 46, 48, and first and second lower side members 50, 52. The handle 36, front wheel support members 38, 40, rear wheel support members 42, 44, upper side members 46, 48 and lower side members 50, 52 may be pivotally connected to each other, as explained in greater detail below. The frame assembly 22 may also include a latch mechanism 54 that is used to limit the motion of the members relative to each other in the operational state shown in FIG. 1, and to permit the relative motion of the members so that the frame assembly 22 may attain a collapsed state.

The arrangement and connection of the members of the frame assembly 22 shown in the Figures is for illustrative purposes only. Other arrangements of members may be used, and the other arrangements may include additional members not shown in the Figures, or may decrease the number of members shown. Further, while the frame assembly 22 is generally symmetrical about a central axis, such that the first side of the frame 22 shown in FIG. 2 is the mirror image of the second side of the frame 22, the frame need not be symmetrical. Also, the pivotal connections may be as they are shown in the Figures and explained herein, or in other places as will be recognized. While a collapsible frame 22 has been shown, aspects of the stroller 22 do not rely on the frame 22 being collapsible and relative to these aspects the fact that a collapsible frame 22 has been shown should not be taken as limiting to the use of these aspects only on collapsible frames.

Turning first to the handle 36, the handle 36 may be formed from a single tube that is bent into a U-shape, having a bight 56 and legs 58, 60. The handle 36 may be hollow, and may be used to mount at least a portion of the latch mechanism 54 and at least a portion of a selector mechanism 62, as shown in FIG. 1, that is used to change the state of the latch mechanism 54, as will be explained in greater detail below. Also, the bight 56 may define a gripping section 64, where the user takes hold of the handle 36 to move the stroller 22. A grip 66, made of a foam material, for example, may be applied to the gripping section 64. Alternatively, a member may be attached to the gripping section 64 and extend from the gripping section 64 at an angle to form a pistol-like grip. As a further alternative, the grip 66 may be omitted.

The pivotal attachment of the various members is now discussed with reference to FIG. 2, recognizing that the stroller 20 as shown is symmetrical about a longitudinal axis such that explanation of the connections for one side of the frame 22 applies with equal force to the other side of the frame 22. As shown in FIG. 2, the handle 36 may be pivotably attached to the first front wheel support member 38 and the first rear wheel support member 42 via the first upper side member 46. That is, the leg 58 of the handle 36 may be pivotably attached to an end 68 of the upper side member 46 at a location 72 between the bight 56 and the end 76 of the leg 58. An end 80 of the front wheel support member 38 may then be pivotably attached to an end 84 of the upper side member 46. An end 88 of the rear wheel support member 42 may be pivotably attached to the upper side member 46 at a location 92 intermediate between the ends 68, 84 of the upper side member 46.

The handle 36 may also be pivotably attached to the front wheel support member 38 via the first lower side member 50. That is, an end 96 of the lower side member 50 may be pivotably attached at a location 100 near the end 76 of the leg 58 of the handle 36. An end 104 of the lower side member 50 may be pivotably attached to an intermediate link 108 at an end 112 of the link 108. An end 116 of the link 108 is attached to the front wheel support member 38 at a location 120 between the end 80 and an end 124 of the front wheel support member 80.

As mentioned previously, the handle 36 may mount at least part of the latch mechanism 54. The latch mechanism 54 may include a pair of latch bars or pins (one of which is shown in FIG. 2, identified as 128) and a pair of latch plates (again, one of which is shown in FIG. 2, identified as 132).

The pin 128 may be fitted into the end 76 of the legs 58 of the handle 36, and may move relative to the end 76 between an extended (or locking) state as shown in FIG. 2 and a retracted (or unlocking) state. In the extended state, the pin 128 may depend beyond the end 76 of the leg 58. In the retracted state, the pin 128 may be at least partially withdrawn into the leg 58 such that the pin 128 does not substantially depend from the end 76 of the leg 58. The pin 128 may be biased toward the extended state through the use of a spring (not shown) or the like.

The plate 132 may be fixedly secured to the rear wheel support members 42 at a location 136 between the end 88 and an end 140 of the rear wheel support member 42. The plate 132 may have a recess 144 formed therein to receive the pin 128 with the pin 128 in the extended state. While the recess 144 is shown in FIG. 2 sized to closely approximate the shape of the pin 128, this need not be the case. Moreover, the plate 132 need not define the entire recess 144 as shown, but may be combined with other structures to define the recess 144, such that the plates only define in part the recess 144.

The movement of the pin 128 upwardly into the handle 36 may be achieved through the use of the selector mechanism 62, as alluded to above. Like the latch mechanism 54, the selector mechanism 62 may be at least in part mounted in the handle 36, although this is not necessary. Instead, the selector mechanism 62 may be attached, for example, to the exterior of the handle 36. As a further alternative, the selector mechanism 62 may be fully mounted inside the handle 36, such that very little of the selector mechanism 62 is visible to the user.

The selector mechanism 62 includes a control lever 148 and cables (not shown) disposed in the legs 58, 60 of the handle 36. The cables are attached at the latch mechanism 54, for example, the pin 128. If a force is applied to the control lever 148 in the direction indicated by an arrow 152, the cables move upwardly within the handle 36. This upward motion of the cables causes the pins (e.g., pin 128) to be withdrawn into the ends (e.g., the end 76) of the legs 58, 60 of the handle 36 against the biasing force of the springs (not shown). If the force is removed, the pin 128, acting under the biasing force of the spring, returns to its extended state.

Figure 4:
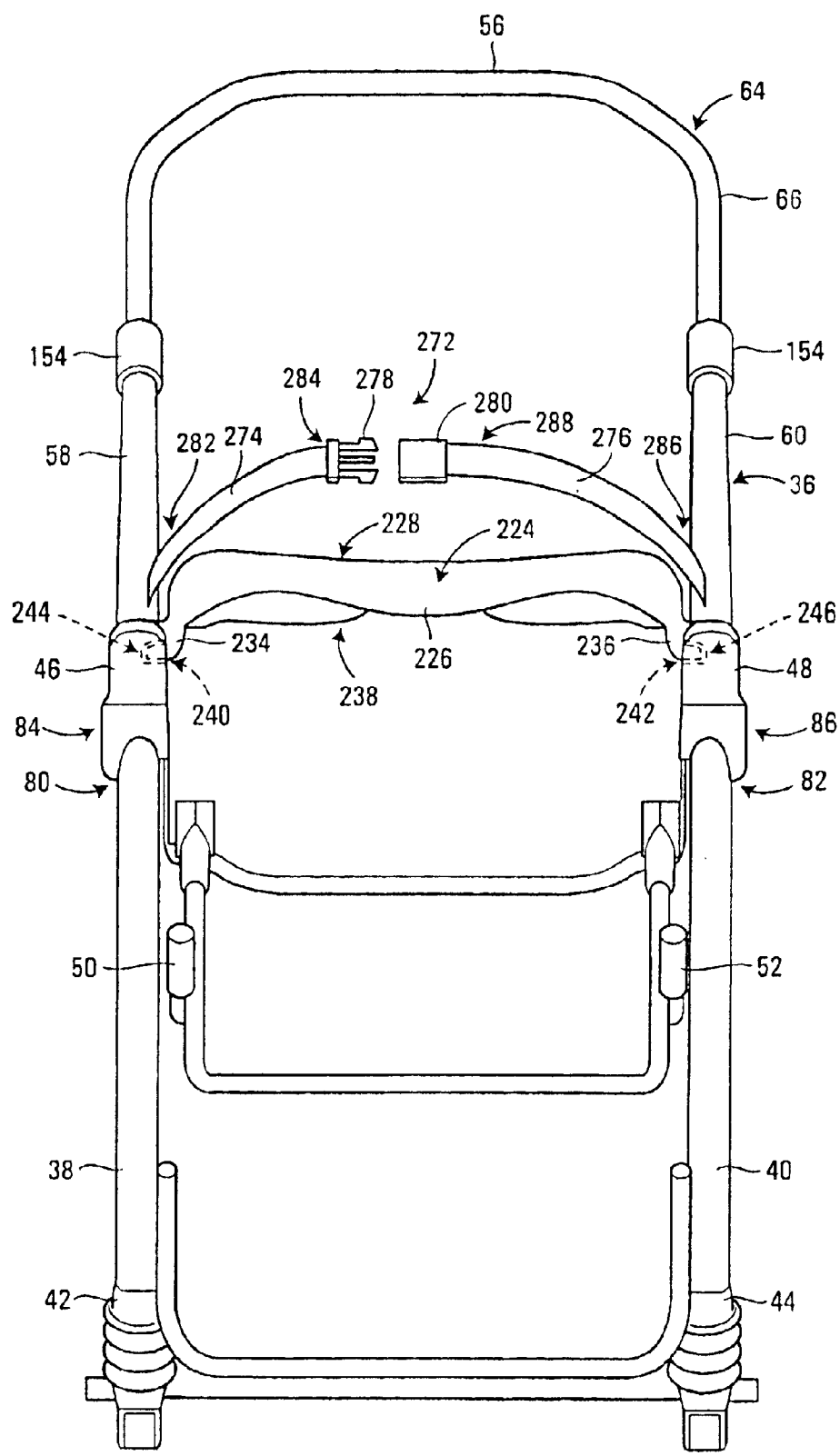
FIG. 4 is a side view of the stroller of FIG. 2.

While the control lever 148 may be disposed, as shown, centrally relative to the bight 56, the control lever may be disposed offset along the bight 56. Alternatively, two control members 154 (see FIGS. 2 and 4) may be provided and may be mounted for movement along the legs 58, 60, each control member 154 attached directly to a separate one of the cables. Further, the alternative two handled arrangement may be used in combination with the selector mechanism 62 described above as a back-up. As a still further alternative, bars or other rigid linkages may be used in place of the cables.

Attached to the frame 22 are the seats 28, 30. While the seats 28, 30 are shown one in front of the other in the Figures, other arrangements may be used, such as a with the first seat 28 beside or next to the second seat 30.

Referring first to FIG. 1 and focusing on the first, or front, seat 28, the front seat 28 may include a seat base 160 and a seat back 162. Both the seat base 160 and the seat back 162 may be defined in part by structural elements of the frame 22 or attached to the frame 22 and cloth or fabric attached to these structural elements (sometimes referred to as soft goods). The seat back 162 may be moveable relative to the seat base 160. In particular, the seat back 162 may pivot between a first (or upright) position as shown and a second (or reclined) position that is not shown.

Referring now to FIGS. 1 and 2, the seat base 160 may be defined by a cloth support having a rigid panel disposed therein and attached at one end to one of the lower side members 50 and at the other end to the other of the lower side members 52. A cross bar may be fixedly attached at ends between the lower side members 50, 52 beneath the cloth support and rigid panel to add further support.

The seat back 162 may be defined in part by a U-shaped frame 164 (shown in FIG. 2) pivotally connected to the lower side members 50, 52. The frame 164 may be covered with a cloth or fabric support, which may also enclose a rigid panel. The cloth support may be joined to or formed integrally with the cloth support that defines the seat base 160. A seat belt may also be attached to the first seat 28 for use in securing a child in the first seat 28 as a safety measure.

Referring again to FIG. 1, the second seat 30 may also include a seat base 166 (not visible in FIG. 1, but shown in FIG. 2) and a seat back 168. Here as well, both the seat base 166 and the seat back 168 may be defined in part by structural elements of the frame 22 or attached to the frame 22 and cloth or fabric attached to these structural elements. The seat back 168 may be moveable relative to the seat base 166. In particular, the seat back 168 may move between a first (or upright) position as shown in FIG. 1 and a second (or reclined) position that is shown in FIG. 2.

As was the case above, the structure of the second seat is discussed with reference to FIGS. 2 and 3, recognizing that similar comments may be made regarding the other side of the stroller 20 given the symmetry of the stroller 20 about its longitudinal axis. The seat base 166 may include a seat base support members 170, 172 (see FIG. 3) may be pivotably attached to the frame 22. For example with reference to FIG. 2, an end 176 of the seat base support member 170 may be pivotally attached to an intermediate link 180, which is in turn pivotably attached to the lower side member 50. An end 184 of the seat base support member 170 is pivotably attached to another intermediate link 188, which is in turn pivotably attached to the handle 36. A cloth support may be attached at its ends to the seat base support members 170, 172, and may enclose a rigid panel. A crossbar may be fixedly attached to the seat base support members 170, 172 beneath the cloth support and rigid panel to add further support.

The seat back 168 may be defined in part by a U-shaped frame 192 that may be pivotally connected to the seat base support members (e.g., 170), for example, at an end 194. The frame 192 may be covered with a cloth or fabric support, which may also enclose a rigid panel. A seat belt may also be attached to the second seat 30 for use in securing a child in the first seat 30 as a safety measure.

A recline mechanism 196 may be provided for the second seat 30. The recline mechanism 196 may include a rigid linkage 198 to position the seat back 168 in a reclined position and an upright position relative to the seat base 166. The recline mechanism 196 may be replaced with recline mechanism using flexible connectors, such as an adjustable strap, rather than the rigid linkages.

The linkage 198 may include an end 202 that is rotatably connected to the frame 36 at a location 206. The linkage 198 may further include a slot 210 extending from the end 202 to an end 214. A pin 218 may be disposed in the slot 210 and fixedly attached to the U-shaped frame 192.

A moveable member 224, for example in the form of a tray, may be attached to the upper side members 46, 48 so as to be moveable relative to the upper side members 46, 48. The moveable member 224 may have a central body 226 with a first side 228 in which recesses 230, 232 (to accommodate, for example, a child's drinking cup and snack of average size) are formed. Two legs 234, 236 may depend from a side 238 opposite the first side 228. The legs 234, 236 may each define a first member 240, 242, for example in the form of a tab, and the side members 46, 48 may each define a second member 244, 246 which is couplable with the first members 240, 242, for example in the form of a groove to receive the tabs therein. With the first members (e.g., tabs) 240, 242 coupled (e.g., received within) the second members (e.g., grooves) 244, 246, the moveable body 224 is guided relative to the side members 46, 48. With the tabs 240, 242 received in the grooves 244, 246, the moveable member 224 is guided in a translating motion relative to the upper side members 46, 48 between at least first and second positions.

A lock assembly or mechanism 248 may be provided to limit the movement of the moveable member 224 relative to the upper side members 46, 48.

Figure 3:
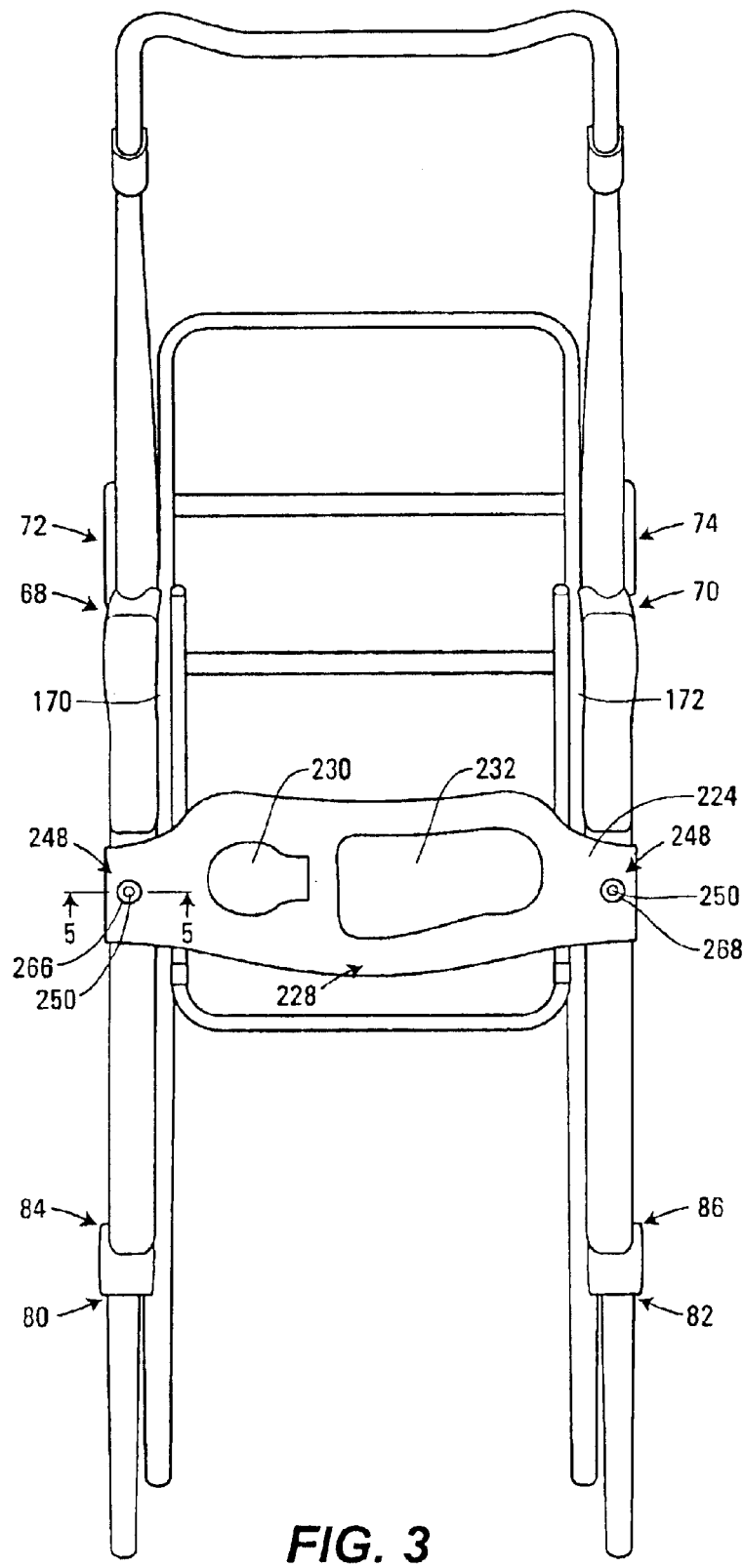
FIG. 3 is a plan view of the stroller of FIG. 2.
Figure 5:
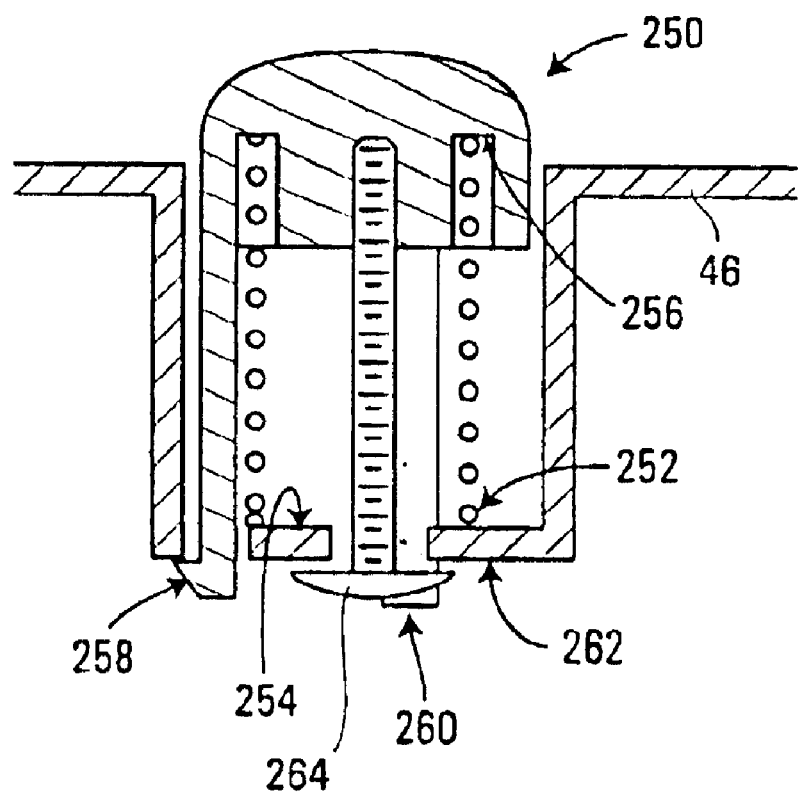
FIG. 5 is an enlarged cross-sectional view of a lock mechanism taken about line 5—5 in FIG. 3.

As shown in FIGS. 3 and 5, the lock mechanism 248 may include a button 250 mounted in the upper side members 46. The button 250 may have a first state (as shown in FIG. 5) wherein the button 250 may depend from the upper side member 46 and a second state wherein the button 250 may be substantially retracted into the upper side member 46. A biasing mechanism 252, such as a spring, may be provided between a surface 254 of the upper side member 46 and a surface 256 of the button 250 to bias the button 250 toward the first state. The button 250 may have three legs (two of which are shown in FIG. 5) that define stops 258, 260 that may cooperate with a surface 262 of the second side members 46 to prevent the button 250 from separating from the second side member 46 under the biasing force of the biasing mechanism 252. A fastener 264 may also be attached to the button 250 to resist the biasing force of the biasing mechanism 252.

The lock mechanism 248 may cooperate with holes 266, 268 in the moveable member 224 (see FIG. 3). With the buttons 250 disposed in the holes 266, 268, the motion of the moveable member 224 is limited relative to the upper side members 46, 48. With a force applied to buttons 250 greater than the biasing force of the biasing mechanisms 252, the buttons 250 may be moved to their second state so as to move the buttons 250 out of engagement with the holes 266, 268 and permit the moveable member 224 to be moved from the first position to at least one second position.

The seat base 166, the seat back 168, the upper side members 46, 48, and the moveable member 224 define a recess 270 into which an infant transporter, such as an infant carrier, for example like that shown in U.S. Pat. No. 4,861, 105, or an infant child restraint system, may be disposed, as shown in dashed line in FIG. 2. A strap assembly 272 may be attached to the frame 22, to secure the infant transporter to the stroller 22. The strap assembly 272 may include first and second straps 274, 276 and mating connectors 278, 280 (see FIGS. 2 and 4). In particular, the first strap 274 may be connected at one end 282 to the leg 58 of the handle 36 and at the other end 284 to the connector 278. Likewise, the second strap 276 may be connected at one end 286 to the leg 60 of the handle 36 and at the other end 288 to the connector 280. With the connector 278 coupled to the connector 280, an infant transporter disposed within the recess 270 may be secured to the stroller 20.

By permitting the moveable member 224 to be moveable from at least a first position to at least a second position (as shown in dashed line in FIG. 2), the stroller 20 may accommodate all of the following: 1) two children, one sitting in the front seat 28 and the other in the back seat 30; 2) one child and an infant transporter, the child sitting in the front seat 28 and the infant transporter disposed in the recess 270 defined with the moveable member 224 in the first position; and 3) one child and an infant carrier, the child sitting in the front seat 28 and an infant transporter different than the one referred to in 2) disposed in the recess defined with the moveable member 224 in the second position.

Figure 6:
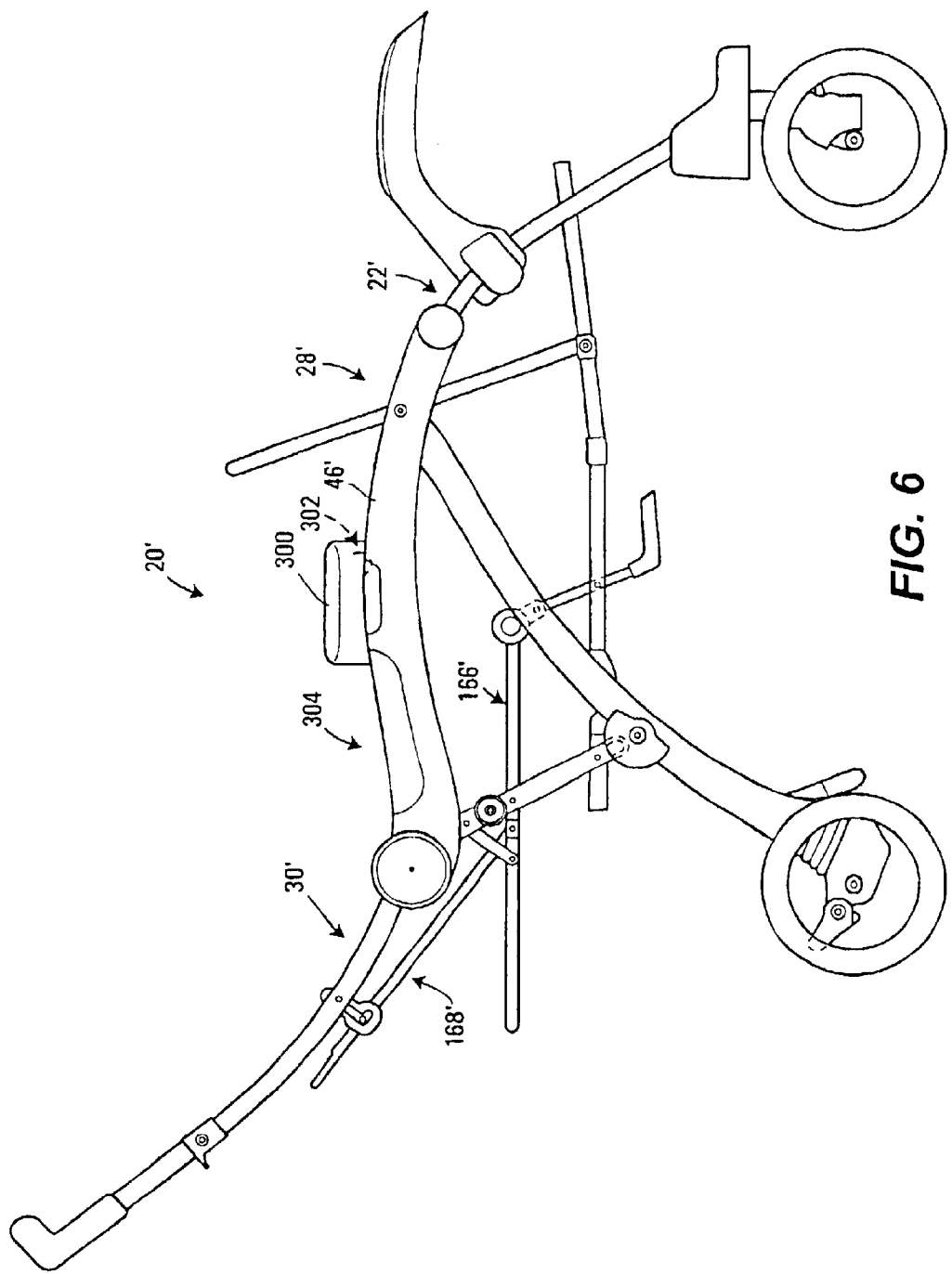
FIG. 6 is a side view of another stroller.
Figure 7:
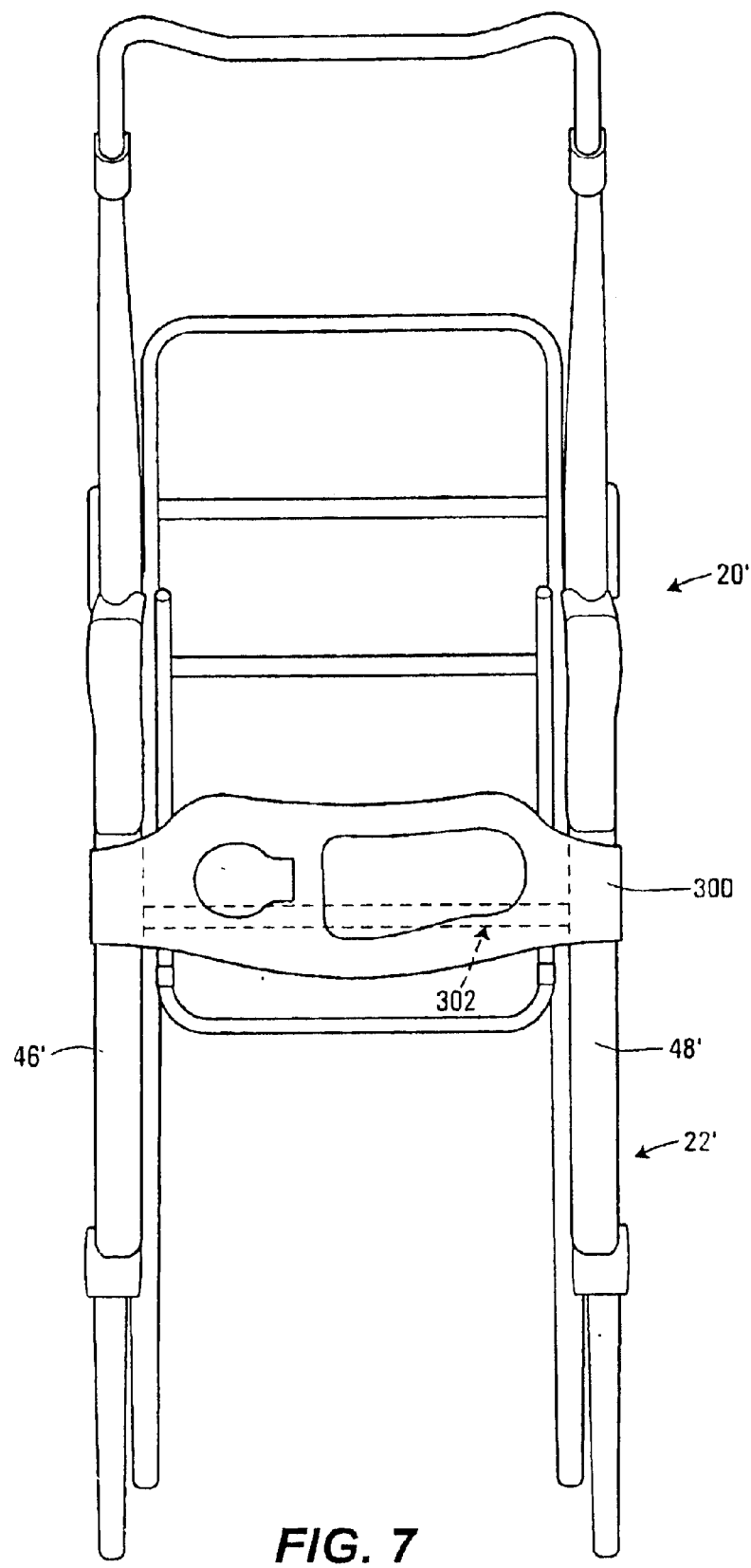
FIG. 7 is a plan view of the stroller of FIG. 6.

FIGS. 6 and 7 show another stroller having many elements in common with the stroller 20 described above. For ease of discussion, similar elements will be numbered similarly, with the elements of the stroller shown in FIGS. 6 and 7 indicated with a prime, e.g., a stroller 20'.

The stroller 20' may have a frame 22' and first and second seats 28', 30' attached to the frame 22'. In particular, the frame 22' may include first and second upper members 46', 48' and the second seat 30' may include a seat base 166' and a seat back 168'. The stroller 20' may also include a first member 300 and a second member 302. The first member 300 may be attached to the first and second upper members 46', 48', or may be detached from the first and second upper members 46', 48' and removed. The second member 302, as shown, may also attached to the first and second members 46', 48' so as to be concealed beneath the first member 300 when the first member 300 is attached to the first and second upper members 46', 48', or revealed when the first member 300 is detached and removed.

With the first member 300 attached, the first and second upper members 46', 48', the second seat seat back 166' and base 168', and the first member 300 define a recess 304 to receive a first infant transporter. With the first member 300 removed, the second member 302 is revealed, and the first and second upper members 46', 48', the second seat seat back 166' and base 168', and the second member 302 define a recess to receive an infant transporter that is different than the infant transporter that would be received in the recess 304 (e.g., an infant transporter that may be larger in at least one dimension that the infant transporter that may be received in the space 304).

Further alternatives to the stroller 20' shown may be discussed. For example, the second member 302 may be detachable from the frame 22' like the first member 300. That is, the second member 302 is not fixedly attached to the first and second upper members 46', 48', such that the second member 302 is concealed when the first member 300 is attached and revealed when the first member 300 is removed. Instead, the second member 302 may be attached as shown in FIGS. 6 and 7 after the first member 300 is detached and removed. As another alternative, the second member 302 may be visible even when the first member 300 is attached to the frame 22', but the bar 302 still only defines a second recess with the first member 300 removed.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents

What is claimed is:

1. A stroller assembly comprising:
a frame including first and second spaced members;
a first seat attached to the frame;
a second seat attached to the frame,
the second seat having a seat base and a seat back, the first and second spaced members disposed opposite each other across seat base;
at least one member disposed opposite the seat back in at least first and second positions, the seat base, seat back, spaced members and the at least one member defining at least two recesses, the first recess defined with the at least one member in the first position to accept a first infant transporter and the second recess defined with the at least one member in the second position to accept a second infant transporter different than the first infant transporter; and a guide having a first member defined by the at least one member and a second member defined by the frame, the first and second members coupled to each other to permit translation of the moveable member relative to the frame.

2. The stroller according to claim 1, wherein:

the at least one member disposed opposite the seat back comprises a moveable member, the seat base, seat back, spaced members and the at least one member defining at least two recesses, the first recess defined with the moveable member in the first position to accept a first infant transporter and the second recess defined with the moveable member in the second position to accept a second infant transporter different than the first infant transporter.

3. The stroller assembly according to claim 1, wherein the first member of the guide comprises a tab and the second member of the guide comprises a groove.

4. The stroller assembly according to claim 3, further comprising:

a lock assembly attached to the frame and selectively attached to the moveable member to maintain the moveable member in at least one of the first and second positions.

5. The stroller assembly according to claim 4, wherein the moveable member has an aperture formed therethrough, and the lock assembly comprises:

a button having a first, operative state and a second, retracted state, the button being disposable in the aperture to maintain the moveable member in one of the first and second positions; and a spring supported between the button and the frame to bias the button into the first, operative state.

6. The stroller according to claim 1, wherein:

the at least one member disposed opposite the seat back comprises a first member in the first position and a second member in the second position, the seat base, seat back, spaced members and first member defining a first recess to accept a first infant transporter, the seat base, seat back, spaced members and second member defining a second recess to accept a second infant transporter different than that the first infant transporter.

7. A stroller assembly comprising:

a frame including first and second spaced members;

a first seat attached to the frame; and a second seat attached to the frame, the second seat having a seat base and a seat back, the first and second spaced members disposed opposite each other across seat base; and a moveable member disposed opposite the seat back and moveable between first and second positions, the seat base, seat back, spaced members and moveable member defining at least two recesses, the first recess defined with the moveable member in the first position to accept a first infant transporter and the second recess defined with the moveable member in the second position to accept a second infant transporter different than the first infant transporter, the moveable member being disposed on the spaced members and being translatable along the spaced members between the first and second positions.

8. The stroller assembly according to claim 7, further comprising a strap assembly attached to the frame proximate to the second seat.

9. The stroller assembly according to claim 8, wherein the strap assembly comprises:

first and second straps, each strap attached at a first end to the frame; and first and second connectors, each of the first and second connectors attached to a second end of one of the first and second straps.

10. The stroller assembly according to claim 7, further comprising a guide having a first member defined by the moveable member and a second member defined by the frame, the first and second members coupled to each other to permit translation of the moveable member relative to the frame.

11. The stroller assembly according to claim 10, wherein the first member of the guide comprises a tab and the second member of the guide comprises a groove.

12. The stroller assembly according to claim 7, wherein:

the moveable member has first and second spaced ends;

the first and second spaced members each have a groove formed therein; and the first end of the moveable member is received in the groove in the first spaced member and the second end of the moveable member is received in the groove in the second spaced member.

13. The stroller assembly according to claim 12, further comprising:

a lock assembly attached to the frame and selectively attached to the moveable member to maintain the moveable member in at least one of the first and second positions.

14. The stroller assembly according to claim 13, wherein the moveable member has an aperture formed therethrough, and the lock assembly comprises:

a button having a first, operative state and a second, retracted state, the button being disposable in the aperture to maintain the moveable member in one of the first and second positions; and a spring supported between the button and the frame to bias the button into the first, operative state.

15. The stroller assembly according to claim 7, wherein the moveable member has an aperture formed therethrough, and further comprising:

a button having a first, operative state and a second, retracted state, the button being disposable in the aperture to maintain the moveable member in one of the first and second positions; and a spring supported between the button and the frame to bias the button into the first, operative state.

16. The stroller assembly according to claim 7, wherein:

the moveable member comprises a tray having at least one recess formed therein.

17. The stroller assembly according to claim 7, wherein:

the first seat includes a seat base and a seat back, the seat back attached to the frame and pivotable relative to the seat base between an upright position wherein the seat back is substantially orthogonal to the seat base and a reclined position wherein the seat back is substantially parallel to the seat base; and the seat back of the second seat is attached to the frame and pivotable relative to the seat base of the second seat between an upright position wherein the seat back is substantially orthogonal to the seat base and a reclined position wherein the seat back is substantially parallel to the seat base.

18. The stroller assembly according to claim 7, wherein:

the frame comprising a handle, first and second upper side members, first and second lower side members, first and second rear wheel support members, and first and second front wheel support members, the handle being pivotally attached to the first and second upper side members and the first and second lower side members, the first upper side member being pivotally attached to the first rear wheel support member and the first front wheel support member and the second upper side member being pivotally attached to the second rear wheel support member and the second front wheel support member, and the first lower side member being attached to the first front wheel support member and the second lower side member being attached to the second front wheel support member.

19. The stroller assembly according to claim 18, the frame having a first, operative state and a second, collapsed state and the tandem stroller assembly further comprising:

a latch pin attached to the handle and moveable relative to the handle between an extended state wherein the latch pin depends from the handle and a retracted state wherein the latch pin is at least partially withdrawn into the handle; and a latch plate with a recess define at least in part thereby, the latch plate attached to at least one of the first and second rear side members, the latch pin received within the recess in the latch plate with the frame in the first, operative state and the latch bar withdrawn from the recess in the second, collapsed state.

20. The stroller assembly according to claim 19, further comprising:

a control lever attached to the handle at a location spaced from the latch pin, the control lever operatively coupled to the latch pin such that movement of the control lever causes a corresponding movement of the latch pin between the extended and retracted states.

21. The stroller assembly according to claim 18, further including:

first and second sets of wheel assemblies, the first set of wheel assemblies attached to the first and second front wheel support members, and the second set of wheel assemblies attached to the first and second rear wheel support members.

22. The stroller assembly according to claim 21, wherein:

first set of wheel assemblies are pivotally attached to one of the first and second wheel support members; and the second set of wheel assemblies are attached to an axle attached to the first and second rear wheel support members.

* * * * *